United States Patent [19]

Seaver

[11] Patent Number: 5,095,515
[45] Date of Patent: Mar. 10, 1992

[54] PHOTOELASTIC OPTICAL SWITCH AND OPTICAL SYSTEMS EMPLOYING THE OPTICAL SWITCH

[76] Inventor: George Seaver, P.O. Box 401, Cataumet, Mass. 02534

[21] Appl. No.: 703,469

[22] Filed: May 17, 1991

Related U.S. Application Data

[63] Continuation-in-part of Ser. No. 439,710, Nov. 20, 1989, Pat. No. 5,016,957.

[51] Int. Cl.5 ............................ G02B 6/10; G02B 6/26
[52] U.S. Cl. ...................................................... 385/16
[58] Field of Search ..................... 350/96.11–96.14, 350/96.29

[56] References Cited

U.S. PATENT DOCUMENTS

| | | | |
|---|---|---|---|
| 4,684,215 | 8/1987 | Shaw et al. | 350/96.14 |
| 4,735,485 | 4/1988 | Fesler | 350/96.29 |
| 4,792,207 | 12/1988 | Shaw et al. | 350/96.29 |
| 4,793,676 | 12/1988 | Risk | 350/96.13 |
| 5,016,957 | 5/1991 | Seaver | 350/96.13 |

Primary Examiner—Akm Ullah
Attorney, Agent, or Firm—Richard P. Crowley

[57] ABSTRACT

An optical switch which comprises a photoelastic, optically transparent material whose index of refraction is changed by stress and which propagates an optical beam or beams from an inlet window to an outlet window in the material, with the inlet window adapted to receive an optical beam from an optical source and the outlet window adapted to pass an optical beam from the photoelastic material to an optical output receptor, and a receptor means of applying a stress gradient to said photoelastic material to change the index of refraction and hence, the optical path of the optical beam between a normal, unstressed optical beam path and a bent, stressed optical beam path. Optical systems are described in which the optical switch is employed to form optical lenses wherein an optical beam is focused by stress within an optical material, such as a photoelastic cylindrical rod. Optical integrated systems are also described employing the optical switch with optical devices as an optical integrated module.

22 Claims, 8 Drawing Sheets

1. INPUT
2. OUTPUT
3. LED
4. DETECTOR

PHOTOELASTIC OPTICAL SWITCH AND OPTICAL SYSTEMS EMPLOYING THE OPTICAL SWITCH

REFERENCE TO PRIOR APPLICATION

This application is a continuation-in-part application of U.S. Ser. No. 07/439,710, filed Nov. 20, 1989 now U.S. Pat. No. 5,016,957.

BACKGROUND OF THE INVENTION

Switching a flow of information from one source to another or from one end user to another is an important function of a transmission or computing system. It was the transistor switch which heralded the computer age. In fiberoptic local area networks (LANs) and in fiberoptic sensor systems, the switching of optical beams or waves has not proven to be easy, even for slow speed bypass applications. The wave or vector nature of photons and the lossy nature of optical interfaces are the reasons. Unlike an electron stream, the beam angle of incidence is an important factor in the transmission of photons through an interface. The presently available techniques for optical switching are: variously complicated, expensive, lossy, confined to a single mode, temperature and environmentally sensitive, wavelength selective, bulky, slow and require moving parts. some of the currently available optical switches are: expanded beam/rotating mirror; moving fiber; polarized beam magnetic rotator; traveling acoustic wave; polarized beam liquid crystal rotator; and an electrically operated Lithium Niobate waveguide; while electrically operated organic polymer waveguides are under development.

It is therefore desirable to provide an optical switch, and optical systems employing the optical switch, and a method of optically switching an optical beam from a one to another position to overcome some or all of the disadvantages of the prior art optical switches. In particular, it is particularly advantageous to provide an optical switch which compared with the state of the art switches is simpler and cheaper and usually with lower losses and crosstalk, and which can be used in single or multimode beams, and which can operate over a wide wavelength range, and is solid state, and is environmentally rugged, and is or can be made temperature insensitive.

SUMMARY OF THE INVENTION

The optical switch of the invention is obtained by applying an inhomogeneous stress field to an optically transparent photoelastic material that propagates an optical beam. The non-uniform refractive index distribution thus formed creates a gradient index that changes the direction of propagation and, subsequently, the output position or angle of the optical beam traveling through the material. This constrasts with the conventional photoelastic technique which relies on the anisotropy of the stress field to change the polarization direction of the optical throughput. In the latter case, the inhomogeneous character of the stress field must be negligible, and the stress gradient must be smaller than the stress anisotropy. In the case of an optical switch the stress gradients must be comparable to the anisotropy, and for both polarizations to be switched the anisotropy must be small.

The present invention relates to a photoelastic optical switch, to optical systems employing the optical switch, and to a method of optically switching an optical beam path from one to another position in a simple, easy and effective manner.

The optical switch of the invention comprises an optical switch for altering and changing the path of an optical beam or beams from one to another position and which optical switch comprises a photoelastic optically transparent material which is in slab or fiber form whose index of refraction changes with mechanical stress and which optically transparent material has an inlet window adapted to receive an optical beam from an optical source and outlet window adapted to pass an optical beam from the optically transparent material to an optical receptor, the optically transparent material permitting the optical beam to pass between the inlet window and the outlet window. The outlet window of the photoelastic material or a portion thereof such as the bottom or upper one-half may be angled as desired to cause the deflected path of the beam to reflect off the angled face of the outlet window and to exit at a defined angle to the undeflected beam path. For example, the lower half of the outlet window may be ground and polished at approximately 45 degrees to the vertical, thereby causing the deflected path of the beam to reflect off of this 45 degree face and to exit at 90 degrees to the undeflected beam path.

The optical switch also comprises means, such as electrical or mechanical means, to apply a predetermined force or bending moment to the photoelastic, optically transparent material in order to form a stress gradient in said photoelastic material, which stress gradient changes the index of refraction of said material so as to form an index of refraction gradient within the material which alters the path of the optical beam passing through the optical material, and therefore changes the beam in the outlet window from an unstressed, normal optical beam path to a stressed, bent optical beam path, thereby providing for a change in position and/or angle between the stressed and unstressed optical beam paths.

The invention comprises also an optical system which includes the optical switch and which includes one or more optical beam sources to provide for one or more optical beams to be placed on the inlet window and which includes optical receptors or non-receptors or a combination of receptors and non-receptors positioned to receive or not to receive in an optimum manner an optical beam before or after emerging from the outlet window.

The method includes the method of switching one or more optical beams between the first and second outlet position, which method comprises providing an optically transparent photoelastic material with an index of refraction changing with stress and having an inlet window and an outlet window and introducing an optical beam into the inlet window from an optical source, passing an optical beam from the outlet window to an optical receptor or non-receptor and applying a predetermined bending moment or force to the photoelastic optically transparent material to form stress gradient within the optically transparent photoelastic material which changes the index of refraction to form an index of refraction gradient, thereby switching the optical beam issuing from the outlet window between a zero stress and a stressed beam position or angle and thereby providing for the optical switching of an optical beam between a first and second position.

The optical switch is dependent upon which photoelastic optical material is used to fabricate the switch, particularly the slab portion. In one embodiment both polarizations are switched, whereas, in another, only one polarization is switched. The difference lies in the molecular physics of the materials used and the resultant degree of anisotropy of the local stress field. If materials such as quartz or polycarbonate plastic are used as the optical material, only the polarized component parallel to the stresses are switched. If plexiglass, i.e. acrylic, or styrene plastic is used, both polarizations are switched. In order to apply a stress gradient to the optical material, it is customary to apply a bending moment to the switch in a plane perpendicular to the optical path, which then sets up a large bending stress gradient in the plane of bending. The beam deflection also occurs in this plane. For a large bending moment arm-to-thickness ratio of the switch, the amplification of the external force or pressure used to set up the internal stress is large. This amplification goes as the square of the thickness, and the beam displacement goes as the cube of this quantity according to:

$$\text{Maximum stress} = 6M/L\, d^2 \quad (1)$$

$$\text{Beam Displacement} = 12LMC/d^3 \quad (2)$$

where
C is the photoelastic constant;
d is the thickness;
M is the bending moment;
L is the optical path length.

The important parameters of the optical switch are the switch material, e.g. quartz, plexiglass, polystyrene, polycarbonate, the applied stress, and particularly the switch thickness, d. The photoelastic transparent optical material may comprise for example Schott Glass Technology's glass material designated SF57 or an equivalent glass material having a near zero stress birefringence and high photoelasticity.

The photoelastic optically transparent material can be in a variety of forms, but typically is in the preferred slab-type form, either square or rectangular, with the stress applied simply by finger pressure or by mechanical levers or by piezoelectric or other techniques to apply a bending moment to the optically transparent photoelastic material.

For example, one method of applying this stress is piezoelectrically. Two thin piezoelectric plates of opposite polarity sandwich the photoelastic material, and when electrically activated, a bending moment and stress gradient is imposed on the switch. This approach has the added advantage of a potential megahertz response rate, depending upon the switch material and size.

Also, in another method of applying this stress, plates made of photostrictive, magnetostrictive, and electrostrictive material, such as lead magnesium niobate or PMN, can be used to apply the bending moment. The plates can be attached to the photoelastic material by adhesives, such as thermosetting resins, like epoxy resin. In the case of non-poled material, such as PMN that can withstand higher temperatures, the plates can be sintered onto the photoelastic material with a powered glass frit or other glass-like material. Optionally, a structural rib running the length or substantially the length, of the plates on one side in the center allows flexure in the photoelastic material transverse to the beam propagation direction only and thus increasing the beam deflection.

The optical switch may be employed in a variety of optical systems. By using appropriate shaped switches and other means, such as point forces, to concentrate and shape the stresses, various stress fields and beam displacements can be realized. In general we can have an optical lens, whose focal properties and focal axis are made variable by varying the applied forces.

The photoelastic material may act as a lens and comprise a slab material or cylindrical rod with inlet and outlet windows, for example at one and the other end. The force is applied to the material to create a stress. The force may be created by torsionally twisting the rod or by the use of a piezoelectric or restrictive material, such as a PMN sleeve secured to the outer surface of the cylindrical rod. The stress is employed to create an index of refraction gradient in a radial direction in relation to the optical beam path to cause the optical beam to be focused at some point along the optical beam axis. The magnitude of the focal length depends upon the amount of the applied force, such combination constituting a photoelastic axisymmetric lens.

For example, piezoelectric or restrictive material plates or sections may be used which are parallel to the input beam and have widths that are approximately one-half the diameter of the entering optical beam and are positioned on the top and bottom of the rectangular photoeleastic material so as to be at the upper and lower, left and right of the beam propagating through the photoelastic material. When the plates or sections are energized and the plates or sections elongated, the beam is focused at some point within the photoelastic material and along the optical beam axis, thereby providing a photoelastic lens. The focal point is determined in part by the strength of the force applied and the resultant strength of the radial index of refraction gradient created within the photoelastic material and centered on the beam. If the force, such as the applied voltage, is adjusted to provide focusing of the beam in one plane only a photoelastic cylindrical lens is created. The output beams exact vertical position can be measured in order to determine the magnitude of the voltage applied to the electrostrictiveive or piezoelectric material so that the device may measure voltage as a voltage meter.

Solid state switching of large multimode beams is possible and specifically, the optical switch can be used to provide default routes in a fiberoptic local area network. It can also be used to sense bending stress in a material, such as in a pressure window in an underwater vehicle. This can be accomplished by measuring the ratio of the intensities of the signals in the "on" and "off" switch output ports as the beam is deflected from one to the other. The switch can also be used to normalize a sensor that operates with a polarized input, such as a photoelastic birefringent pressure sensor, by an on-command removal of the first polarizer in order to provide a reference signal output.

The principle of the photoelastic optical switch as disclosed can be used in an array of switches by scribing or etching the thin electrode surfaces of the stress-producing plates. This electrically insulates one section from another and allows each section to be individually addressed and switched. This configuration can then be used to deflect the incoming beam so as to active or bypass optical devices located on or in the photoelastic optical material, thereby creating an optical integrated circuit module. This module can be used by itself or in conjunction with other such modules to provide for optical signal processing.

The optical switch may have photostrictivee material, such as plates, secured to the photoelastic material wherein the stress and index gradient created across the optical material is caused by photonically activating the plates secured to the upper and lower surfaces of the photoelastic optical material, said plates now being caused to elongate or contract by the application of photons from an external radiation source to the plates.

The photons can be directed to photoconductive material, such as cadmium sulfide or diamond, whose conductivity is, consequently, greatly increased, which then allows an electric charge to reach the piezoelectric or PMN plates secured to the upper and lower surfaces of the photoelastic optical material, said plates are then caused to contract or elongate thereby deflecting or switching the beam propagating in the photoelastic optical material. The switch-activating photons also can be absorbed directly by photostrictive plates secured to the upper and lower surfaces of the photoelastic optical material, which plates then contract thereby creating an index of refraction gradient in the photoelastic material and consequently deflecting the beam propagating through the switch, said plates, for example, being a class of polymers, such as N-isopropylacrylamide with light-sensitive chromophore and trisodium salt of copper chrophyllin, which undergo a phase transition and accompanying volume decrease upon the absorption of photons.

An optical integrated circuit module comprising one or more optical switches may be formed wherein the photoelastic optical material contains on its surfaces in specific positions optical devices such as diffraction lenses, gratings, microdetectors, microlaser diodes, and other miniature integrated devices such that the beam or beams propagating in the photoelastic optical material can be steered by the individually addressed piezoelectric or restrictive material sections to activate or bypass said integrated devices, said beams then being refocused by other piezoelectric plates or restrictive materials when necessary, such combinations of switching and beam processing then being an optical integrated circuit module which can be operated alone or in conjunction with other such similar modules. In the optical integrated circuit module, the plates secured to the upper and lower surfaces of the photoelastic material may be PMN electrostrictive material connected to an electrical energy source.

The optical integrated circuit module may have plates secured to the upper and lower surfaces of the photoelastic material which are actuated by photons.

The invention will be described for purposes of illustrations only in connection with certain preferred embodiments; however, it is recognized that various changes, modifications, improvements and additions may be made to the optical switch, optical systems and methods as described by the applicant, all falling within the spirit and scope of the invention.

DESCRIPTION OF THE EMBODIMENTS

Figure 1:
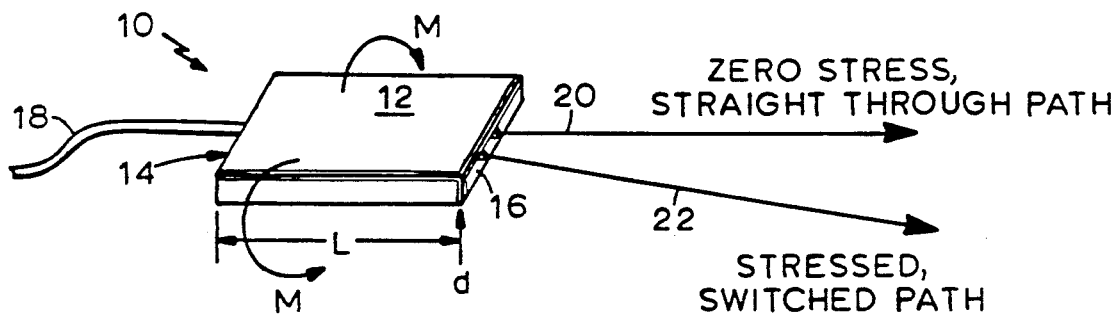
FIG. 1 is a schematic, illustrative view of the basic optical switch of the invention.

In FIG. 1 the principle of the photoelastic optical switch is illustrated. FIG. 1 shows an optical switch 10 comprising a generally rectangular slab of photoelastic transparent material 12, such as plexiglass, having an inlet window 14 at the one end and an outlet window 16 at the other and opposite end. An optical beam guided in an optical fiber 18 is incident on the inlet window and passes through the optical material 12 and out an outlet window 16 and such path is known as the normal, unstressed optical beam 20. The bending moment M is applied to the optical material 12 to create a gradient stress and gradient index of refraction within the material 12 so as to provide for the movement of the normal, unstressed optical beam 20 to a stressed optical beam 22 as illustrated in FIG. 1. For example, the optical material 12 may comprise a one-inch wide, two-inch long, one-eight inch thick plexiglass plate material that is subject to a bending induced stress from finger pressure and will produce an angular beam displacement of about two degrees experimentally or about two beam diameters at the outlet window, 16 as illustrated in FIG. 1. In another example, a one-inch wide, one millimeter thick optically transparent quartz plate that is subject to a bending induced stress of 3700 psi has an angular beam displacement from the normal unstressed path of about one degree experimentally.

Figure 2:
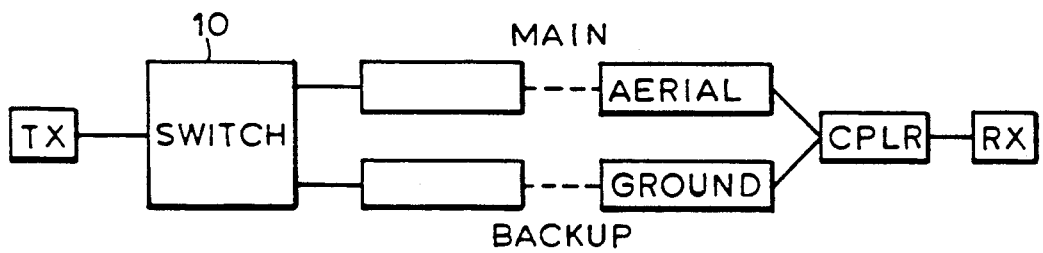
FIG. 2 is a schematic, illustrative view of the optical switch of FIG. 1 in an optical system providing a back-up optical fiber transmission line for a communications system.

FIGS. 2-5 show various applications of the optical switch of the invention as illustrated in FIG. 1 in the fields of fiberoptic telemetry and communications. In these and other applications, the optical switch can be operated locally and manually or by electrically operated solenoids or piezoelectric plates controlled locally or at a central computer station. The optical systems illustrated in FIG. 2 are applications of fiberoptic transmission links where it is desirable to have a back up or fallback line wherein the optical switch is employed. FIG. 2 illustrates a system which employs an optical transmitter TX transmitting an optical beam to a switch 10 which then directs the beam to a main or a back up transmission line and then through a coupler CPLR, and hence to a receiver RX with the optical switch providing for the transmitter to move between the main and the back up line as desired, such selection accomplished by applying a bending moment to the optical switch to provide for a zero stress or a stressed optical beam path.

Figure 3:
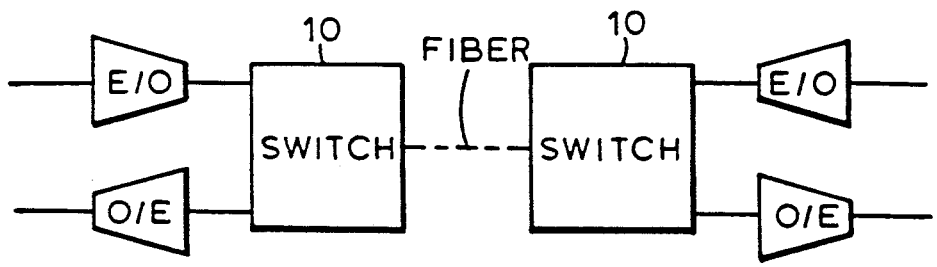
FIG. 3 is a schematic, illustrative view of the optical switch of FIG. 1 in an optical system which allows two-way communication on a single optical fiber.

FIG. 3 illustrates a bi-directional optical communications system which shows two optical switches 10 connected to a single fiber line so as to allow bi-directional communications by initially configuring the switches so that an electric-to-optic transmitter E/O is coupled to one end and an optical-to-electrical O/E receiver is coupled to the other end; then both switches are changed to the stressed condition whereby the first end is now an O/E receiver and the other end becomes an E/O transmitter.

Figure 4:
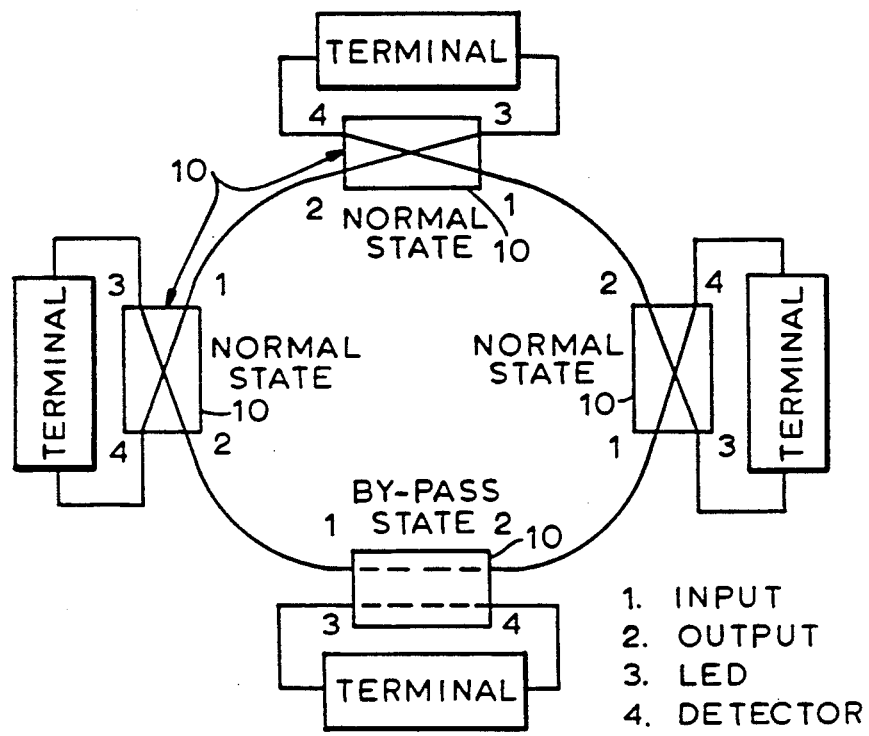
FIG. 4 is a schematic, illustrative view of the optical switch of FIG. 1 that permits normal and bypass configuration for terminals in a fiberoptic local area networks.

FIG. 4 is a schematic illustration of bypass switching in a token-ring local area network employing optical fiber communications. The optical switch 10 in the token ring allows normal and bypass configurations of the individual terminals. In the bypass mode, the terminal is removed from the optical loop. This bypass or "crossback" configuration is achieved by using two optical switches, such as those illustrated in FIG. 1, with the "on" fiber of the first switch coupled to the "off" fiber of the second switch and "on" fiber of the second switch coupled to the "off" fiber of the first switch.

Figure 5:
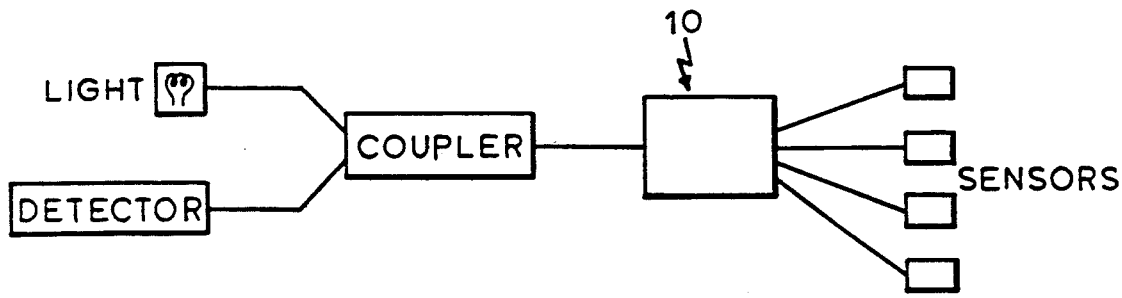
FIG. 5 is a schematic, illustrative view of the optical switch of FIG. 1 in an optical system which allows several sensors to be serviced by a single optical fiber.

FIG. 5 is a schematic illustration of an optical system which shows the optical switch 10 of FIG. 1 employed in an optical system with four instead of two output fibers, which switch is used to couple a light source and a detector to four optical sensors in a sequential manner based upon the amount of bending moment applied to the optical switch 10.

Figure 6B:
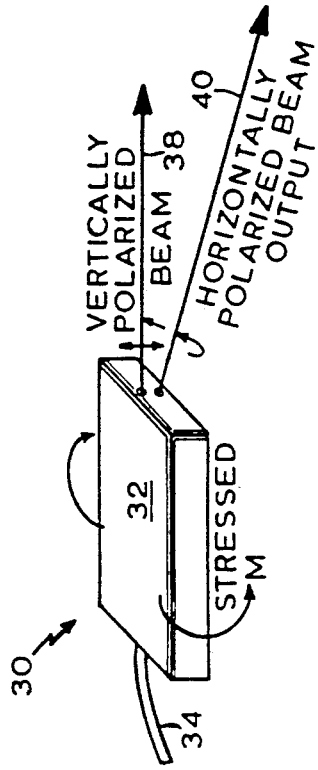
FIGS. 6a-b is a schematic, illustrative view of the optical switch of FIG. 1 in an optical system when operated as a polarizing switch by using fused quartz as the photoelastic material.
Figure 6A:
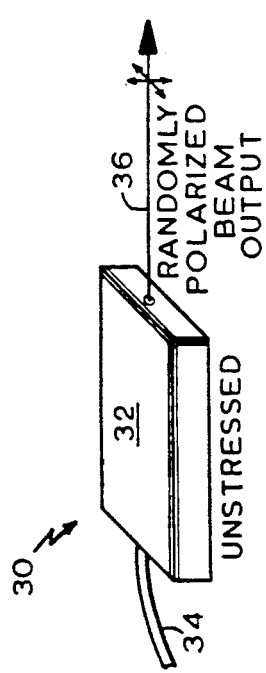

FIG. 6 is a schematic, illustrative view of an optical switch 30 of the invention shown in FIG. 6(a) in the unstressed condition and composed of a fused quartz plate material 32 having an input fiber 34 and with a randomly polarized, unstressed beam path output 36. Shown in FIG. 6(b) is the optical switch 30 in a stressed condition with the randomly polarized beam input 34 wherein the stress gradient deflects the horizontal polarization of the beam to output path 40 and allows the vertical polarization to pass through virtually undeflected to output path 38.

Figure 7B:
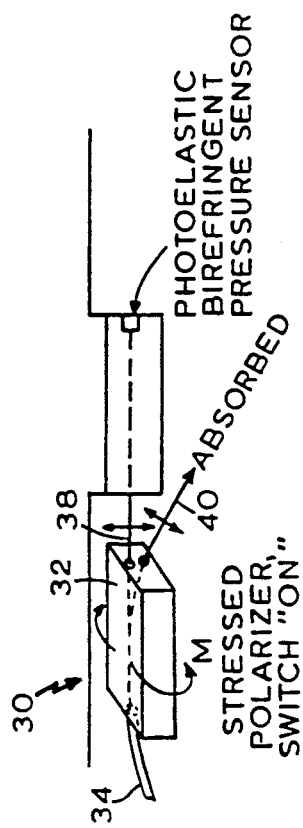
FIG. 7a-b is a schematic, illustrative view of the optical polarizing switch of FIG. 6 used to normalize a photoelastic birefringent pressure sensor when the switch is in the "off" position and to allow sensing when in the "on" position.
Figure 7A:
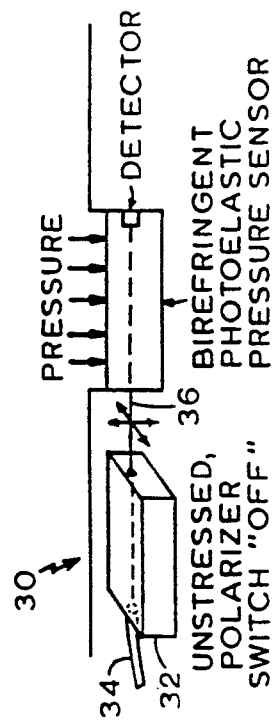

FIG. 7 is a schematic, illustrative view of a photoelastic, birefingent pressure sensor employing the polarization optical switch 30 of FIG. 6. The switch 30 acts as a polarizer to the input beam 34 to the pressure sensor and, with a conventional polarizer after it, the sensor then measures the pressure external to the sensor. FIG. 7(a) shows the sensor in a reference state, where FIG. 7(b) shows the sensor in a measurement state. In FIG. 7(a), the polarizer switch 30 is unstressed and in an "off" position so that with the first polarizer absent, the beam passes through the sensor unaffected by pressure. Because light sources can drift with time, this provides a means of continually normalizing the sensor output by simply periodically removing the force and bending moment from the first polarizer. FIG. 7(b) shows a photoelastic birefringent pressure sensor in the measurement condition with the optical switch stressed, and the output beam 38 to the pressure sensor now polarized.

Figure 8B:
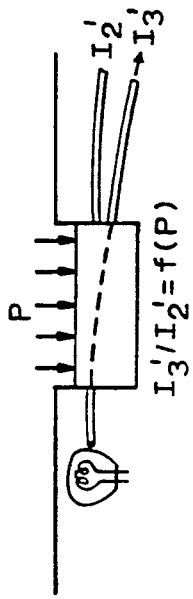
FIG. 8a-b is a schematic, illustrative view of the optical switch of FIG. 1 when employed as a pressure and bending stress sensor.
Figure 8A:
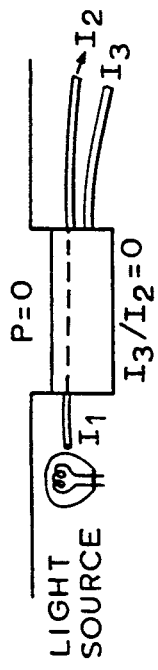

FIG. 8 is a schematic, illustrative view wherein the optical switch itself is used as a pressure and bending stress sensor, and the "on" and "off" outlet fibers on the outlet window are placed close enough together so that the output intensity continuously decreases in the "off" or upper fiber as the intensity in the "on" or lower fiber continuously increases along with the pressure and bending stress, and the ratio of "on" to "off" fiber intensities gives a drift-free and sensitive measure of pressure. FIG. 8(a) shows the switch in a zero pressure state while FIG. 8(b) shows the switch in a elevated pressure state.

Figure 9C:
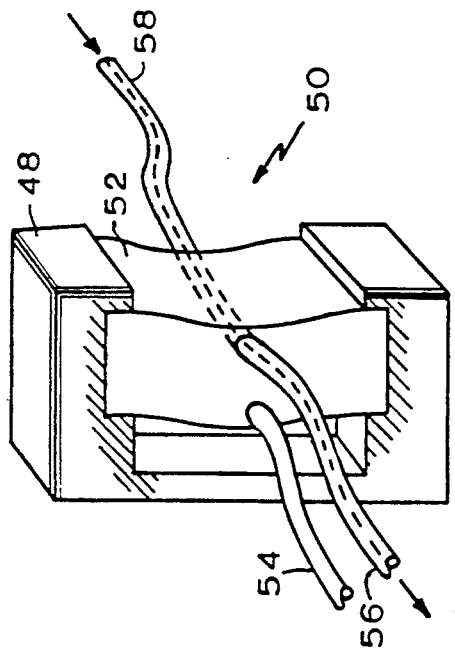
FIGS. 9a-d is a schematic, illustrative view which shows a method of applying a bending moment to the optical switch of FIG. 1 and which finger pressure changes the bending moment of the switch from concave to convex or the reverse.
Figure 9D:
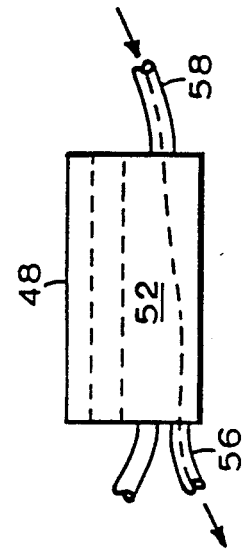
Figure 9A:
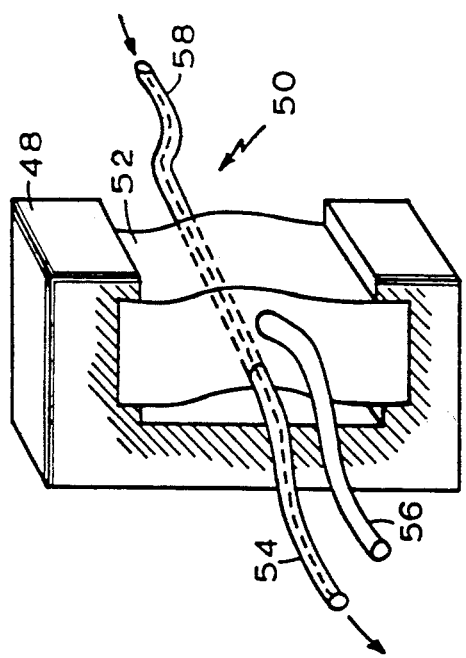
Figure 9B:
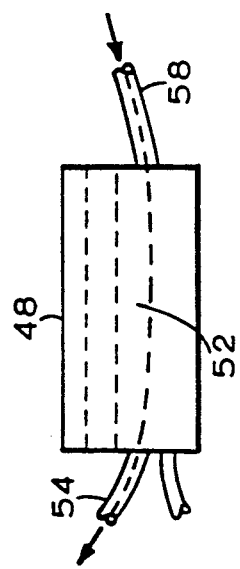

FIG. 9 is an illustrative, schematic view of a manually operated photoelastic optical switch of the invention 50 wherein FIG. 9(a) is a side view of the switch in the "on" position, and FIG. 9(b) is a top view of the switch in the "on" position. FIG. 9(c) is a side view of the switch in the "off" position, and FIG. 9(d) is a top view of the switch in the "off" position. FIG. 9 shows a casing 48 for a snap-actuated optical switch and shows the optical switch 50 having a photoelastic transparent material 52 in a casing 48 and having two output fibers 54 and 56 and input fiber 58 from an optical source. As illustrated more particularly by FIGS. 9(c-d), the photoelastic material may be actuated or switched by finger pressure on the photoelastic material 52. Thus, FIG. 9 shows a manual method of applying the bending moment to the photoelastic transparent material 52 of an optical switch in which finger pressure alters the bending from concave to convex or the opposite, thereby reversing the bending stress from tension to compression or from compression to tension. By this operation, the optical switch switches the beam of the input fiber 58 to the output fiber 54 or to 56; this actuation technique is the familiar cricket-type technique found in children's toys.

Figure 10:
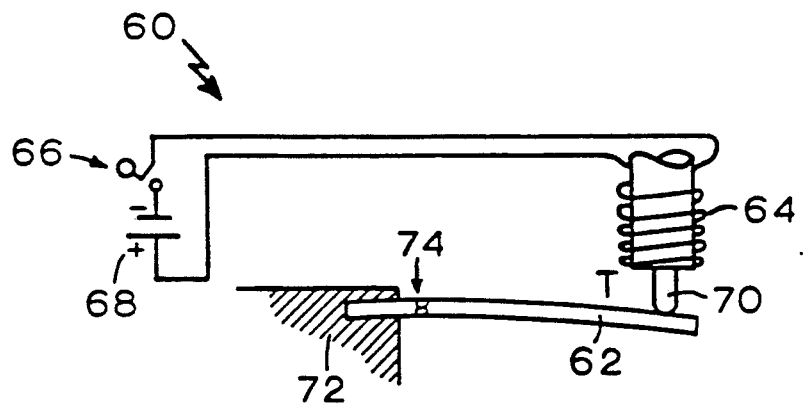
FIG. 10 is a schematic, illustrative view of an optical switch in a system to compensate the optical switch for the temperature changes.

FIG. 10 is a schematic, illustrative view of an optical system which illustrates a remotely operated solenoid method of applying a bending moment to an optical switch which is compensated for temperature changes. FIG. 10 shows a system 60 composed of a slab of plexiglass as a photoelastic transparent material 62 secured at the one end by a holder 72. At the other end of the photoelastic switch material 62 there is a plastic arm 70 within a solenoid 64, which arm expands with temperature, and which solenoid is connected by an electrical switch 66 to an electric power source 68, and which switch has an optical beam 74 passing perpendicularly through the photoelastic material 62. The photoelastic material 62 made of plexiglass has a photoelastic constant C in equation 2 that changes about one percent per degree centigrade. FIG. 10 illustrates a temperature compensation technique in which the arm 70 expands with temperature to apply an increasing displacement or force and bending stress to the optical switch 62 with increasing temperature. The increase in stress on the photoelastic material 62 is designed to compensate exactly for the decrease in the constant C caused by the increase in temperature thereby providing for a temperature-compensated optical switch.

Figure 11:
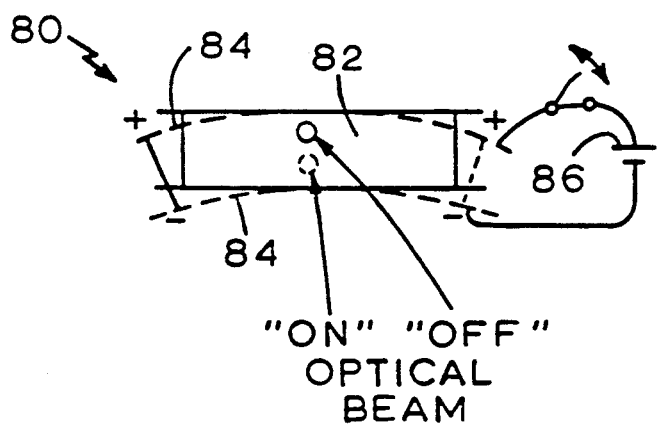
FIG. 11 is a schematic, illustrative view of an optical switch of the invention when the stress is applied by piezoelectric techniques.

FIG. 11 is a schematic, illustrative view of a piezoelectric operated optical switch of the invention 80 showing the switch in the "off" or unstressed position in solid lines and in the "on" or stressed position in dotted lines, and wherein the switch includes a pair of piezoelectric thin plates 84, for example of quartz of opposite piezoelectric polarity, applied on either side of the photoelastic transparent material 82. These piezoelectric plates provide, on the application of an electrical voltage from the source 86, a tension-compression bending moment to the photoelastic material 82, and thereby cause the transparent material to move from an "off", zero stress position to an "on", stressed position. The piezoelectrically-operated switch 80 operates by electrically expanding the top piezoelectric plate 84 and contracting the bottom plate 84 so that the bending moment is applied to the optical switched material 82. This bending moment can be reversed at a rate of kilohertz to megahertz depending upon switch material and size.

Figure 12:
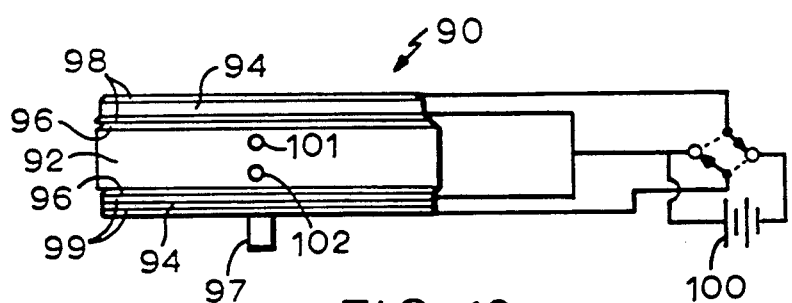
FIG. 12 is a schematic, illustrative view of the optical switch of the invention when the stress is applied by electrostrictive materials, such as lead magnesium niobate (PMN) plates.

In FIG. 12, the use of electrostrictive material, such as lead magnesium niobate, is shown. An optical switch at 90 includes a pair of thin, electrostrictive plates 94 secured to a photoelastic material 92 with an adhesive 96, which may be epoxy resin or a sintered glass frit. A voltage supply circuit at 100 applies a voltage across the electrodes 98 of the upper plate to deflect the beam upwards to position 101, or to the electrodes 99 of the lower plate to deflect the beam downwards to position 102. Rib 97 runs the length of plate 94 and allows only flexure transverse to the beam direction.

Figure 13A:
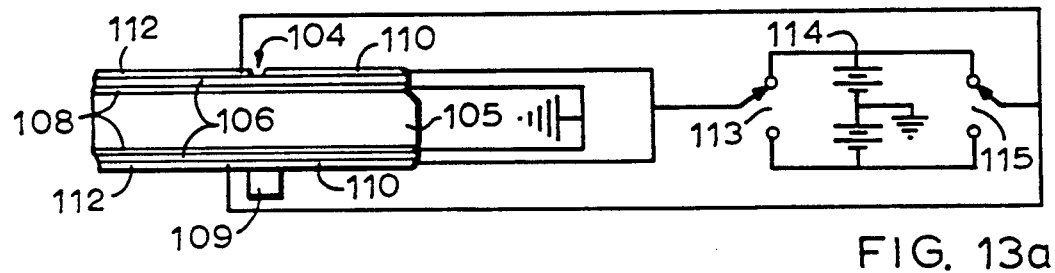
FIG. 13 is a schematic, illustrative view of the optical switch end view FIG. 13a and a top view FIG. 13b of the invention when used to switch and/or deflect more than one beam propagating the the same optical material.
Figure 13B:
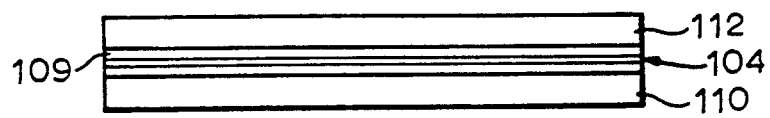

FIG. 13 shows the principle of the photoelastic optical switch when configured in an array of such switches. The piezoelectric sandwich 106 has continuous electrodes 108 that are between the photoelastic material 105 and the piezoelectric plates 106 and are kept at a common voltage. The outer electrodes of the piezoelectric plates are etched or scribed at 104 to create electrically insulated sections 110 and 112 that in conjunction with electrodes 108 and the voltage supply circuit 114 can be operated separately by electrical switches 113 and 115. This allows two beams in the same substrate 105 to be independently switched or deflected. The structural rib 109 maximizes the deflection.

Figure 14:
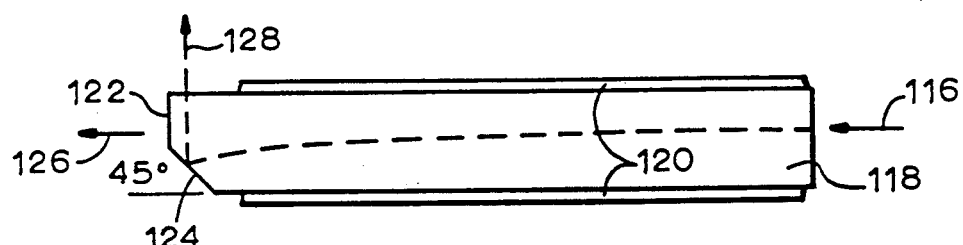
FIG. 14 is a schematic, illustrative view of the optical switch of the invention when configured such as to make the switched beam exit at 90 degrees to the un-switched beam.

FIG. 14 is a schematic view of the optical switch configured to allow the output beam positions to be at approximately 90 degrees to each other. The beam 116 enters the photoelastic material 118 and exits at 126 through the window 122 in its normal status. When the piezoelectric plates 120 deflect the beam, it strikes the surface 124 which is at approximately 45 degrees to the beam. The beam is totally reflected and exits the switch at 128.

Figure 15A:
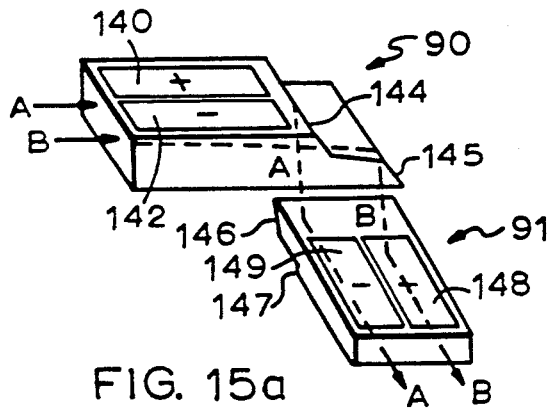
FIG. 15 is a schematic, illustrative view of two optical switches, FIG. 15a and FIG. 15b, of the invention that when taken in series operate as a bypass switch.
Figure 15B:
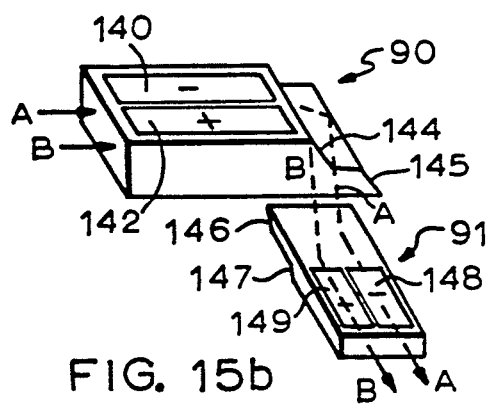

FIG. 15 is a schematic view of two optical switches of the invention that when operated in series become a bypass switch, such as that used at a computer terminal in a fiberoptic local area network. In FIG. 15a beam A in channel 140 of a switch 90 reflects off the 45 degree surfaces 144 and 146 and enters channel 149 in switch 91. Piezoelectric plate 149 then causes beam A to exit switch 91 in the proper position. Beam B in channel 142 is deflected by plate 142 to reflect off of 45 degree surfaces 145 and 147 and to exit switch 91 via channel 148. In FIG. 15b, the voltages on piezoelectric plates 140 and 142, and also on plates 148 and 149 are exactly reversed, and beams A and B exit switch 91 exactly reversed from that of FIG. 15a, and bypass or crossback operation is achieved.

Figure 16:
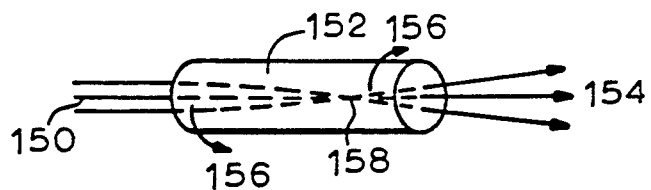
FIG. 16 is a schematic, illustrative view of the optical switch of the invention when used to focus a beam by the application of torsional stresses.
Figure 17:
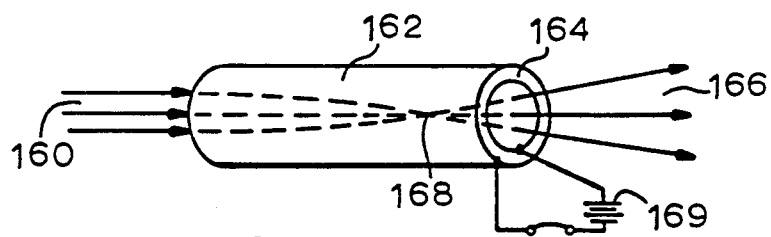
FIG. 17 is a schematic, illustrative view of the optical of the invention when used to focus a beam by the use of a cylindrical piezoelectric sleeve to create the stress.
Figure 18A:
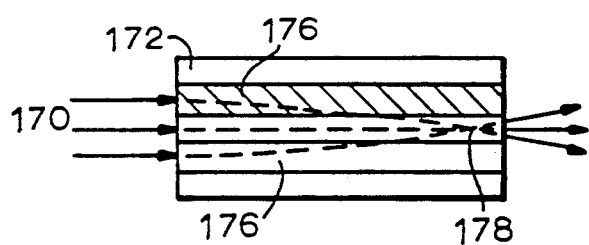
FIG. 18 is a schematic, illustrative view of the optical switch, FIG. 18a top view and FIG. 18b end view, of the invention where pairs of the piezoelectric strips are used to focus the beam.
Figure 18B:
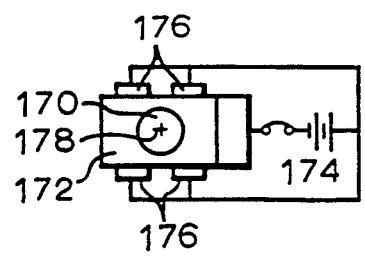

FIGS. 16-18 show three means of using the principle of the photoelastic optical switch to focus beams propagating in the photoelastic optical material.

In FIG. 16, torsional forces 156 cause the entering beam 150 to see an axisymmetric radial stress gradient in the cylindrical photoelastic material 152. The beam 150 is thus brought to a focus at the point on the axis 158 and then to exit at 154.

In FIG. 17, a piezoelectric sleeve 164 is caused to elongate through the application of voltage 169. This creates an axisymmetric radial stress gradient in the photoelastic material 162 thereby focusing beam 160 at position 168.

In FIG. 18, four piezoelectric plates 176 are elongated through the application of a voltage by circuit 174. This creates an axisymemetric radial stress gradient in photoelastic material 172 centered at the intersection of the two planes bisecting the two pairs of plates. This stress and index gradient causes the beam 170 to focus at 178 within the rectangular photoelastic material 172.

Figure 19:
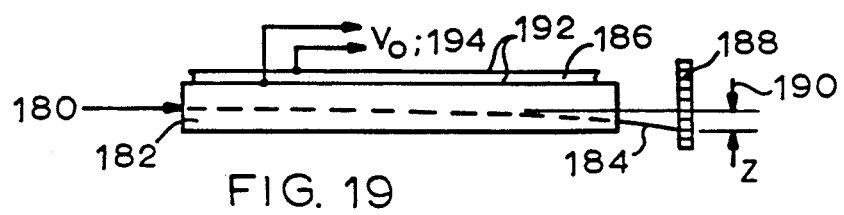
FIG. 19 is a schematic, illustrative view of the optical switch of the invention when used as a voltmeter.

FIG. 19 shows the principle of the photoelastic switch when used as a voltmeter. The unknown voltage Vo at 194 is applied across the plate 186 by the electrodes 192. The beam 180 enters the photoelastic material 182 and is deflected to path 184 by the stress gradient caused by the flexing of plate 186. The beam is incident on beam position detector 188 at position 190, this position then being a direct measure of the applied voltage Vo.

Figure 20:
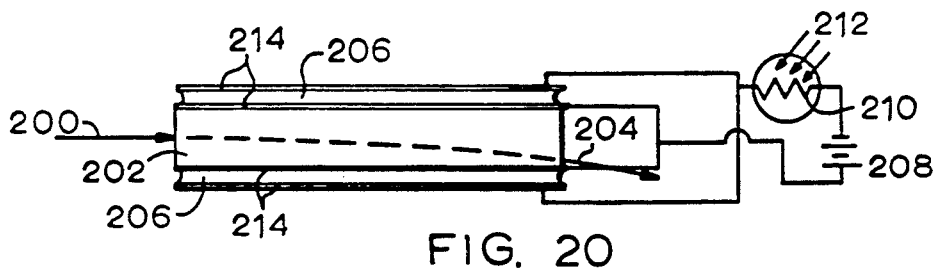
FIG. 20 is a schematic, illustrative view of the optical switch of the invention where the voltage is applied to the piezoelectric plates by photonically activating a photoconductive material.

FIGS. 20 and 21 show the photoelastic optical switch when caused to operate by photons instead of voltage.

In FIG. 20, photons 212 are incident upon a photoconductor 210, greatly increasing its conductivity and allowing the voltage 208 to be applied to the elctrodes 214 of the piezoelectric plate 206. This causes a stress gradient in the photoelastic material 202 thereby causing the entering beam 200 to be deflected to path 204.

Figure 21A:
FIG. 21 is a schematic, illustrative view of the optical switch, FIG. 21a and FIG. 21b, of the invention where photostrictive plates can create the stress gradient that deflects the beam.
Figure 21B:
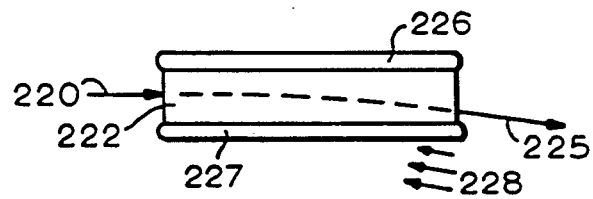

In FIG. 21a, the photons 228 are absorbed directly by the photostrictive polymer plate 226, which contracts. This imposes a stress gradient across the photoelastic material 222 which deflects the incoming beam 220 to the exit path 224. In FIG. 21b, the photons 228 are absorbed by plate 227, thus deflecting beam 220 in the opposite direction to position 225.

Figure 22A:
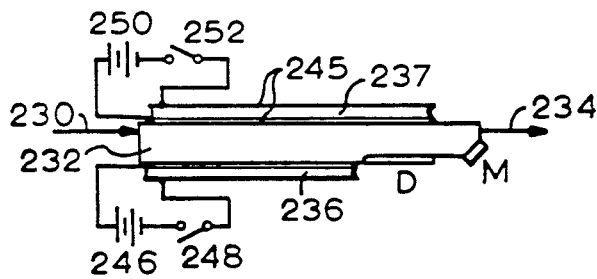
FIGS. 22a-b is a schematic, illustrative view of the optical switch of the invention where the piezoelectric plates deflect the beam towards integrated optical devices.
Figure 22B:
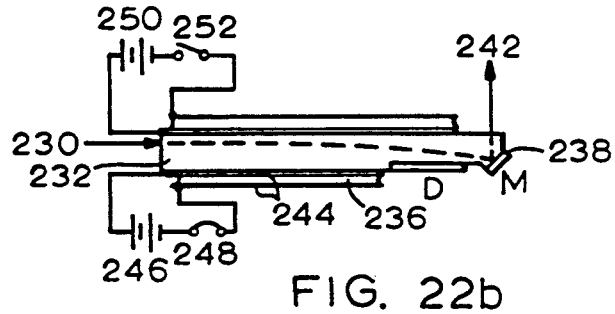
Figure 22C:
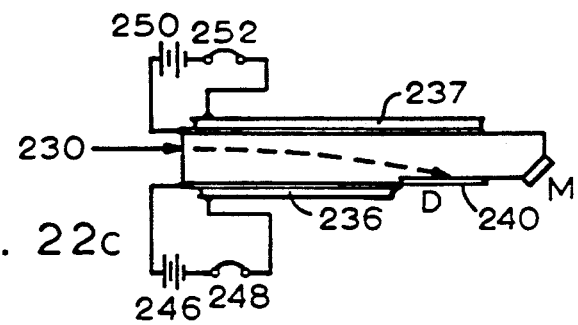

FIG. 22 shows the principle of the photoelastic optical switch when used to create an optical integrated circuit and beam processor. In FIG. 22a, input beam 230 and output beam 234 are colinear, as electrical switches 248 and 252 are open and no stress gradient is preset. In FIG. 22b, switch 248 is closed, voltage 246 is applied at electrodes 244 across piezoelectric plate 236 and the input beam 230 is deflected within the photoelastic material 232 to an optical integrated device 238, such as a modulator, and thence reflected 90 degrees to exit at 242. In FIG. 22c both switches 248 and 252 are closed, voltages 246 and 250 are applied across plates 236 and 237, respectively, and the input beam 230 is deflected to another optical integrated device 240, such as a detector.

When a stress is applied to an optical material, the resultant strain causes the index of refraction, that is, the speed of light in that material, to change. It is made smaller (light speed is increased) under tension, and larger under compression. In a bending condition, such as is shown in FIG. 1, the upper part of the material is under tension, and the lower part is under compression. If an optical beam or wave propagates through this stress field, then the upper part of the wave front travels faster than the lower part, and the wave front pivots and heads off at an angle to its original direction, as shown in FIG. 1. The degree of directional change is dependent upon the relation between the index change and the applied stress (the photoelastic constant, C), the applied force and bending moment, and the distance over which the stress and index change (the thickness of the material).

An optical wave has two polarizations, each perpendicular to the other and to the direction of travel of the wave. In some materials, such as plexiglass and polystyrene plastic, both polarizations are deflected by the stress and index of refraction gradient, as shown in FIG. 1 and FIG. 8. In other materials, such as fused quartz and polycarbonate plastic, the polarization in the direction of the stress is deflected by the stress gradient and the polarization perpendicular to the stress experiences little or no deflection as shown in FIG. 6.

What is claimed is:

1. An optical switch for altering the path of an optical beam, which optical switch comprises:
   a) an optically transparent, photoelastic material whose index of refraction changes with mechanical stress and which optical material has an inlet window adapted to receive an optical beam from an optical source, an outlet window adapted to pass an optical beam from the photoelastic transparent material, the photoelastic, transparent material permitting an optical beam to pass between the inlet and outlet windows; and
   b) means to apply a predetermined force to the photoelastic material which comprises a restrictive material secured to the photoelastic material and which restrictive material is selected from the group of materials of electrostrictive, magnetostrictive and photostrictive materials, which restrictive materials respectively contract or elongate on application of electrical, magnetic and photon energy forces to form a mechanical stress gradient within such material which changes the index of refraction of said material concurrent with the change is stress gradient, said stress gradient being applied generally perpendicularly to said optical beam path within said transparent material so as to alter the otical beam between an unstressed optical beam path and a stressed optical beam path thereby providing for the change in the output angle and position of the unstressed and stressed optical beam paths from the outlet window.

2. The optical switch of claim 1 wherein the photoelastic material is characterized by a near zero stress birefringence.

3. The optical switch of claim 1 wherein the means to apply force comprises two plates of restrictive material secured to opposite surfaces of the photoelastic material whereby on the application of energy forces to one or both plates, contraction of the one or both plates occurs to apply a mechanical stress gradient to the photoelastic material.

4. The optical switch of claim 3 wherein the restrictive material comprises an electrostrictive material composed of lead magnesium niobate whereby on the application of electrical voltage to the electrostrictive material, a positive or negative stress gradient occurs to provide an index of refraction gradient across the photoelastic material.

5. The optical switch of claim 4 wherein the plates are secured to the photoelastic material by a sintered glass frit material layer.

6. The optical switch of claim 3 wherein the surfaces of the plates are formed to insulate one section from another to provide an array of optical switches in the same photoelastic material with more than one beam deflected or acted upon in more than one operation.

7. The optical switch of claim 3 wherein one or both plates have a central, exterior, longitudinal rib means to allow flexure transverse to the beam propagation direction only.

8. The optical switch of claim 1 wherein the outlet window has a face at a defined angle from the vertical to permit the deflected, stressed optical beam path to reflect off the face and to exit at a defined angle to the undeflected, unstressed optical beam path.

9. The optical switch of claim 8 wherein one-half of the output window face is at an angle of 45 degrees from the vertical to permit the deflected, stressed optical beam path to reflect off the 45 degree face and to exit at an angle of 90 degrees to the undeflected, unstressed optical beam path.

10. The optical switch of claim 1 which includes a pair of optical switches and wherein the optical switches are arranged whereby the stressed optical beam path from the outlet window of one switch is the optical beam received by the inlet window of the other optical switch thereby providing an optical bypass-type optical switch module.

11. The optical switch of claim 1 wherein the restrictive material comprises a photostrictive material and which includes a photon radiation source and wherein the photostrictive material is photonically activated by photons from the radiation source to provide the photostrictive material to contract or elongate to create stress and an index gradient in the photoelastic material.

12. The optical switch of claim 3 wherein the plates include a photoconductive material on the plates whereby photons directed to the photoconductive material cause a voltage to be applied to the plates which then causes the contraction or elongation of the plates.

13. The optical switch of claim 3 which includes means to measure the vertical position of the optical beam from the outlet window to determine the magnitude of the electrical force applied to the plates.

14. A photoelastic, axisymmetric optical lens apparatus which comprises:
   a) an optically transparent, photoelastic material whose index of refraction changes with mechanical stress and which optical material has an inlet window adapted to receive an optical beam from an optical source, an outlet window adapted to pass an optical beam from the photoelastic transparent material, the photoelastic, transparent material permitting an optical beam to pass between the inlet and outlet windows;
   b) means to apply a predetermined force to the photoelastic material to form a mechanical stress gradient within such material which changes the index of refraction of said material concurrent with the change in stress gradient, said stress gradient being applied generally perpendicularly to said optical beam path within said transparent material so as to alter the optical beam between an unstressed optical beam path and a stressed optical beam path thereby providing for the change in the output angle and position of the unstressed and stressed optical beam paths from the outlet window; and
   c) wherein the means to apply the predetermined force applies force of selected magnitude in a radial direction in relation to the axis of the beam passing through the photoelastic material to provide for the focusing of the beam within the photoelastic material at some point on the beam axis to provide a photoelastic lens.

15. The lens apparatus of claim 14 wherein the photoelastic material comprises a cylindrical rod.

16. The lens apparatus of claim 14 which includes means to apply a predetermined force by torsional twisting of the cylindrical rod.

17. The lens apparatus of claim 14 which includes means secured to the outer surfaces of the photoelastic material, which means comprises a piezoelectric or an electrostrictive material and means to apply electrical energy to the piezoelectric or electrostrictive material to focus the beam within said photoelastic material.

18. The lens apparatus of claim 17 wherein the photoelastic material comprises a cylindrical rod and the piezoelectric or electrostrictive material comprises a sleeve secured to the outer cylindrical surface of the cylindrical rod.

19. The lens apparatus of claim 17 wherein the piezoelectric or electrostrictive material comprises parallel plates secured to the upper and lower surfaces of the rectangular photoelastic material, and the plates have a width about-half the optical beam whereby on the application of electrical energy to the plates, the optional beam is focused at some point along the beam axis, said focal point being determined in part by strength of the electrical energy to the plates and the resultant index of refraction within the photoelastic material.

20. The lens apparatus of claim 17 which includes means to measure the focus position of the focused beam as a measured of the electrical energy applied to move the focused optical beam.

21. An optical integrated module which comprises a photoelastic optical material having a plurality of optical switches within thereof and optical devices on the surface so that the optical beam passing through the optical switches can be directed to or bypass one or more of said optical devices to provide an optical integrated circuit module on the photoelastic material.

22. The integrated module of claim 21 which includes plurality of separate piezoelectric or electrostrictive plates secured to the photoelastic material to direct optical beams to various optical devices by beam deflection, switching or focusing through the employment of electrical energy to the plates.

* * * * *